(12) United States Patent
Patel et al.

(10) Patent No.: US 8,432,275 B2
(45) Date of Patent: Apr. 30, 2013

(54) MOBILE DEVICE SAFETY

(75) Inventors: Labhesh Patel, San Francisco, CA (US);
Sanjeev Kumar, Sunnyvale, CA (US);
Shmuel Shaffer, Palo Alto, CA (US);
Mukul Jain, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 482 days.

(21) Appl. No.: 11/972,551

(22) Filed: Jan. 10, 2008

(65) Prior Publication Data

US 2009/0179752 A1    Jul. 16, 2009

(51) Int. Cl.
*G08B 1/08*    (2006.01)

(52) U.S. Cl.
USPC ............... 340/539.22; 340/539.1; 340/539.11

(58) Field of Classification Search .................. 340/515, 340/517, 539.11, 539.13; 370/310; 455/9
See application file for complete search history.

(56) References Cited

U.S. PATENT DOCUMENTS

| | | | |
|---|---|---|---|
| 4,611,209 A * | 9/1986 | Lemelson et al. ............ 701/514 |
| 5,552,772 A * | 9/1996 | Janky et al. ................ 340/573.4 |
| 5,736,940 A * | 4/1998 | Burgener ..................... 340/994 |
| 6,028,514 A * | 2/2000 | Lemelson et al. ........ 340/539.13 |
| 6,084,510 A * | 7/2000 | Lemelson et al. ........ 340/539.13 |
| 6,297,766 B1 * | 10/2001 | Koeller ..................... 342/357.31 |
| 6,317,058 B1 * | 11/2001 | Lemelson et al. ............. 340/910 |
| 6,683,538 B1 * | 1/2004 | Wilkes, Jr. ..................... 340/903 |
| 6,845,320 B2 * | 1/2005 | Tompkins et al. ............. 701/446 |
| 7,006,793 B2 * | 2/2006 | Himmel et al. .............. 455/41.1 |
| 7,013,151 B2 * | 3/2006 | Hirokawa .................. 455/456.1 |
| 7,084,775 B1 * | 8/2006 | Smith ......................... 340/601 |
| 7,095,336 B2 * | 8/2006 | Rodgers et al. ............... 340/903 |
| 7,113,107 B2 * | 9/2006 | Taylor .......................... 340/901 |
| 7,248,159 B2 * | 7/2007 | Smith ...................... 340/539.13 |
| 8,271,003 B1 * | 9/2012 | Othmer et al. ................. 455/466 |
| 2003/0134627 A1 * | 7/2003 | Himmel et al. .............. 455/419 |
| 2003/0210143 A1 * | 11/2003 | Haddad ..................... 340/539.13 |
| 2007/0265911 A1 * | 11/2007 | Rondeau ......................... 705/14 |
| 2008/0125078 A1 * | 5/2008 | Morimoto .................. 455/404.2 |
| 2012/0302264 A1 * | 11/2012 | Wakabayashi et al. ........ 455/457 |

* cited by examiner

*Primary Examiner* — Jennifer Mehmood
*Assistant Examiner* — Rufus Point
(74) *Attorney, Agent, or Firm* — Tucker Ellis LLP (57) ABSTRACT

In an example embodiment, an automatic warning system that warns users of personal mobile devices (such as cellular telephones and portable music players) when they enter or are near the threshold of a hazardous area while using their mobile device. In an example embodiment, the mobile device is automatically paused upon entering a street and resumes when the user has crossed the street. In a cellular telephone embodiment, calls are automatically put on hold upon entering the hazardous area, optionally the other parties to the call are informed of the reason for the hold, and the call is automatically resumed when all parties have left the hazardous area.

24 Claims, 5 Drawing Sheets

FIG. 11

MOBILE DEVICE SAFETY

TECHNICAL FIELD

The present disclosure relates generally to portable, mobile devices.

BACKGROUND

The popularity of personal mobile electronic devices has increased dramatically in recent years. Such devices include but are not limited to cellular telephones, portable music players such as the Apple iPod™, and radios such as the Sony Walkman™. There have been news reports of people being hit by vehicles when crossing street while they were busy using their personal mobile devices. Because of such problems, recent legislation has been introduced banning people from crossing streets while listening to their personal electronic devices, such as the iPod™, or while talking on cell phones. According to the proponents of the legislation, users of portable electronic devices are so distracted that they cannot see or hear a car coming.

BRIEF DESCRIPTION OF THE DRAWINGS

The accompanying drawings incorporated herein and forming a part of the specification illustrate the example embodiments.

OVERVIEW OF EXAMPLE EMBODIMENTS

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising a positioning module and an alarm module. The positioning module is configured to determine a current location. The alarm module determines from the current location whether the apparatus is in a hazardous location. The alarm module is configured to communicate a warning responsive to determining the apparatus is in a hazardous location.

In accordance with an example embodiment, there is disclosed herein an apparatus comprising a transceiver operable to send and receive data, a positioning module, and an alarm module. The positioning module is operable to receive data from the transceiver for determining the current location of an associated wireless device. The alarm module is configured to determine from the current location of the associated wireless device whether the associated wireless device is in a hazardous area. The alarm module is operable to send data to the associated wireless device via the transceiver responsive to determining that the associated wireless device is in a hazardous area.

In accordance with an example embodiment, there is disclosed herein a method comprising determining a current position of an associated device, plotting the current position on a map, and determining from the current position plotted on the map whether the associated device is located in a hazardous area. A warning is communicated to the associated device responsive to determining from the current position plotted on the map that the associated device is located in a hazardous area.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements.

In accordance with an example embodiment, described herein is a system equipped with a precision positioning device such as a Global Positioning System (GPS) device and street mapping data. For example, the European Union already has plans to roll out a GPS network for public use that is accurate to within inches. In an example embodiment, a personal music system (such as an iPod™) that is not connected to any wireless network (such as cellular network or WiFi, etc.) processes the real time positioning and static mapping data locally. The processing is continuous. Revaluation is constantly performed to monitor whether the device is about to cross a street boundary.

Techniques that monitor a threshold (in this example, a street boundary) may consume very little Central Processing Unit (CPU) resources when away from the threshold (for example when a person is far away from a street boundary) and more CPU resources when the device (person) is near the threshold, requiring more frequent polling. CPU resource consumption also depends on velocity. Higher velocity uses more frequent polling. When the device (e.g., the person carrying the device) is about to cross (or has crossed) a street boundary, an alarm or trigger is raised by the continual query system.

In an example embodiment, upon getting an alarm from the continual query system, the device (for example, a personal music system) is automatically paused until another trigger fires, indicating that the person/device is no longer on the street and/or at the street boundary. For example, when a person listening to a portable musical device such as an iPod™ steps onto a street, the device automatically pauses so that the person can hear the street sounds. The device automatically resumes playing the music when the device/person is no longer on the street (for example, when completed crossing the street). In particular embodiments, the user can bypass an alarm by pressing a button that overrides the continual query system. In an example embodiment, the mobile device is equipped with an external microphone, which can capture the surrounding noise. As the user is about to cross the street, the system pauses the music and mixes in an amplified audio from the external microphone. In an example embodiment, the device warns the user when at a street boundary by whispering (for example superimposing a low volume sound) a warning that the person is about to cross the street. If the user acknowledges (for example by pressing a button), then the device does not automatically pause playing as in other embodiments. In an example embodiment, the device is equipped with a voice recognizer apparatus, and a user can acknowledge that he is aware that he is crossing the street by speaking aloud a preset command.

In an example embodiment, if the device is coupled to a network, a node on the network determines the location of the device and communicates a warning to the device when appropriate. For example, the device may be a cell phone or any other network equipped personal device (such as Blackberry™ or iPhone™). In this example embodiment, positioning data can be sent to a server for further processing. The continual query/monitoring can be performed at the server or another node on the network, thereby consuming less power on the device itself. Nevertheless, a particular embodiment employs location calculation at the endpoint, as this topology scales better and does not compromise the privacy of the whereabouts of the end-user. In an example embodiment, when the continual query/monitoring node detects that the device/person is crossing a street boundary, then it sends a whisper and/or pause command to the device. Similarly, the continual query/monitoring node sends a resume command to the device when the person is no longer on the street.

In example embodiments implemented on a cell phone, if the cell phone of one (first) party is automatically paused in response to detecting the party is crossing a street, then the system puts the call temporarily on hold and whispers to the other (second) party that the call has been put on hold because the first party is currently crossing a street and that the call will be resumed when the first party is no longer on the street.

In an example cell phone-based embodiment, the system does not put the call on hold, but instead warns both the first party and the second party that the first party is about to cross the road. In an example embodiment, the system only whispers the warning message to the first party. In an example embodiment, for example during a conference call, the warning system activates when any party in the conference call is crossing the street. In particular embodiments, the system temporarily puts the user crossing the street on hold and resumes the conference call when the user has crossed the street. In a particular embodiment, the system records the conversations while the person was on hold so that the person can listen to it later.

In an example embodiment, the user can set his warning or pausing preferences so that system can automatically pause or whisper, depending on the user's preference. In an example embodiment, the system provides a user interface with which a user can select streets or locations where the user does not want the system to activate automatically. For instance, the user can log on to the user preference website and set user preferences there. These preferences are then sent to the continual query component on either the server or the device.

In an example embodiment, the system uses emitters on the roadside (such as an infra-red emitter, Bluetooth triangulation emitters, etc.) and corresponding readers/receivers on the mobile device. The data is either processed locally or relayed to a central server for further processing. In a particular embodiment, the emitters are fed data from cameras or infra-red sensors installed at intersections to transmit warnings when vehicles are approaching. The embodiments described herein are applicable to any mobile personal device such as a Personal Digital Assistant (PDA), music player, cellular telephone, radio, or any audio/visual device. In yet another embodiment, a car like the Apple iCAR (see for example http://www.news.com/8301-10784_3-9768521-7.html) is equipped with a system which notifies iPhones in its vicinity about the approaching car. This electronic announcement of an approaching car feature can be very beneficial as an electric car emits very low sound.

In an example embodiment, the continual query system determines the relative velocity between the device and a moving hazard such as a motor vehicle (e.g. car) or train. The continual query system determines from the current position rendered on a virtual map and the relative velocity whether the associated device will collide with (or move within a predetermined amount of space, e.g. five feet, of) the moving hazard. If there is a possibility of a collision or moving within the predetermined amount of space, an alarm is generated.

Figure 1:
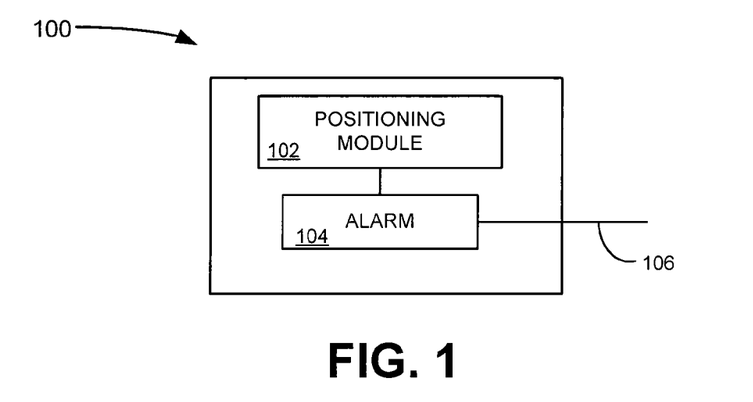
FIG. 1 is a block diagram of a continual query system in accordance with an example embodiment.

Referring to FIG. 1, there is illustrated a continual query system 100 in accordance with an example embodiment. Continual query system 100 is suitable for use with a mobile electronic device. Continual query system 100 comprises a positioning module 102 and an alarm module 104. Alarm module 104 produces an output 106.

Positioning module 102 comprises logic for determining a current location. "Logic," as used herein, includes but is not limited to hardware, firmware, software, and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, a memory device containing instructions, or the like, or combinational logic embodied in hardware. Logic may also be fully embodied as software. Positioning module 102 may suitably comprise a wireless receiver (not shown) for receiving positioning data. Alternatively, positioning module 102 may be coupled to a wireless transceiver for receiving positioning data.

In an example embodiment, the apparatus is not connected to a network, such as a wireless local area network (WLAN) or cellular network, therefore positioning module 102 acquires positioning data for the apparatus. For example, positioning module 102 can determine a location/position by measuring signals acquired from known sources, such as a global positioning system (GPS).

In other embodiments, positioning module 102 can be implemented on an infrastructure node and can determine the position of wireless devices associated with a network. For example, positioning module 102 can acquire received signal strength indication (RSSI) and/or angle of arrival (AOA) data from other infrastructure nodes, such as access points APs, to determine the position of an associated wireless device. Although not described in detail, an example embodiment includes a distributed topology. For example, the positioning functionality is distributed between the endpoint and the infrastructure of the network to which the endpoint is coupled.

Alarm module 104 is in data communication with positioning module 102 and comprises logic that can determine whether the location calculated by positioning module 102 is within a predefined hazardous location. For example, a predefined hazardous area can include, but is not limited to, streets, highways, railroad tracks, right of ways, and/or any area where a user of a mobile device should be aware of traffic and/or other hazards. Alarm module 104 communicates an alarm or output 106 responsive to determining that the current location calculated by positioning module 102 is within a predefined hazardous area, such as a street.

In an example embodiment, alarm module 104 produces a warning signal suitably comprising audio, visual, and/or audiovisual signal that is provided by output 106. In another example embodiment, alarm module 104 outputs a signal indicating an alarm condition, for example a digital one when the apparatus is in a hazardous area and a digital zero otherwise. As will be described in more detail herein, the output can be superimposed (e.g. a whisper) on the audio output of the device, or the device's audio output can be interrupted (e.g. a phone call on a cellular device can be put on hold) while a warning is communicated. In some embodiments, the alarm is comprised of machine generated speech or a prerecorded messages. As another example, the audio of the device can be muted (either fully or partially) while an audio signal conveys the warning. In other embodiments, output 106 may comprise a visual signal, such as a flashing light, or produce motion signal, such as vibration.

In an example embodiment, a controllable switching device is coupled to an audio output of an associated device and to output 106 of alarm module 104. The controllable switching device is operable to output the audio output of the associated device while the alarm module is not in an alarm state. The controllable switching device is operable to provide the output of the alarm module while the alarm module is in an alarm state.

In an example embodiment, positioning module 102 further comprises a mapping module. The mapping module is configured to render the current location on a virtual internal electronic map, enabling alarm module 104 to determine whether the user is within a predefined hazardous area, such as a street. For example, the mapping module can determine if the map coordinates for the current location determined by positioning module 102 correspond to a street or highway. If so, alarm module 104 communicates an alarm.

In an example embodiment, positioning module 102 further comprises a velocity sensor for determining velocity. Alarm module 104 determines from the current position and velocity whether the apparatus is at risk of entering a predefined hazardous area in less than a predetermined time. Alarm module 104 is responsive to communicate a warning in response to determining the apparatus is at risk of entering a predefined hazardous level in less than a predetermined time. For example, for a music player, alarm module 104 may generate a warning if alarm module 104 determines from the current location and velocity that the mobile device may enter a predefined hazardous area (such as a street) within two seconds. Positioning module 102 may determine velocity as either a scalar (e.g. 20 mph) or a vector (10 degrees from North at 20 mph).

In an example embodiment, a user input is provided. The user input can enable a user of a device to discontinue communication of an alarm. For example, if a user is jogging in the street, the user may use the user input to discontinue alarm warnings while the user in the street. In an example embodiment, the user input is a button. In particular embodiments, the user input includes voice recognition logic, enabling a user to provide voice commands to the device.

In an example embodiment, continuous query system 100 comprises a user interface. The user interface can include the user input described herein and is operable to receive data representative of areas for the positioning module to ignore and to not communicate warning. In particular embodiments, the user interface enables a user to specify type of alarm For example, the interface can receive data indicating whether the alarm should be an audio alarm, visual alarm, audiovisual alarm, or motion (vibration).

In an example embodiment, continual query system 100 comprises a wireless interface (such as a receiver) that is in data communication with alarm module 104. Alarm module 104 is operable to receive a wireless signal from an external source via the wireless interface. Alarm module 104 communicates a warning responsive to determining that the mobile device is located on a street and receiving a signal via the wireless interface that a vehicle is also on the street. For example, the wireless interface can receive signals from local infrared devices or a WiFi network. In this embodiment, an alarm may not be generated while the device is in the street unless a nearby vehicle is detected. This option may be configurable using a user interface.

In an example embodiment, continual query system 100 is embodied in a cellular telephone. Alarm module 104 is in communication with the cellular telephone logic. Alarm module 104 is configured to place a call on hold while the apparatus is in a hazardous area. In particular embodiments, alarm module 104 is configured to notify the other party (or parties) to a call that the call is on hold.

In an example embodiment, continual query system 100 is embodied in a network infrastructure node, such as a server, and is operable to monitor the position of mobile devices associated with the network and signal alarms to the mobile devices when appropriate. In this embodiment, continual query system 100 is coupled to a transceiver operable to send and receive data. Positioning module 102 is operable to receive data from the transceiver for determining the current location of an associated wireless device. Alarm module 104 is configured to determine from the current location of the associated wireless device whether the associated wireless device is in a hazardous area. Alarm module 104 is operable to send data to the associated wireless device over the network via the transceiver responsive to determining that the associated wireless device is in a hazardous area.

Figure 2:
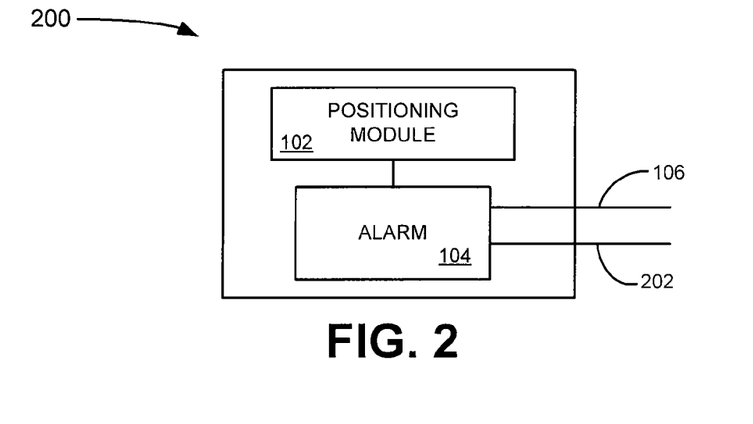
FIG. 2 is a block diagram of a continual query system with multiple outputs.

FIG. 2 is a block diagram of a continual query system 200 with multiple outputs. Output 106 is active when alarm module 104 detects a device is in a hazardous area. Output 106 may be a digital output (e.g. 0 when inactive, 1 when active; or send a digital signal, e.g. 001, that indicates an alarm and the type of alarm; or convey a digital stream which may contain audio, visual, or audiovisual data). Alternatively, output 106 can be an analog output containing audio, visual, and/or audiovisual data. Output 202 can be employed for signaling when the device is not in a hazardous area and/or has left a hazardous area. For example, output 202 can output a digital 1 when the device is not in a hazardous area. This output can be provided to the device being protected, which can enable the device to determine when to output its regular output. For example, if a device mutes its output while in alarm mode, output 202 can inform the device when to stop muting its output.

Figure 3:
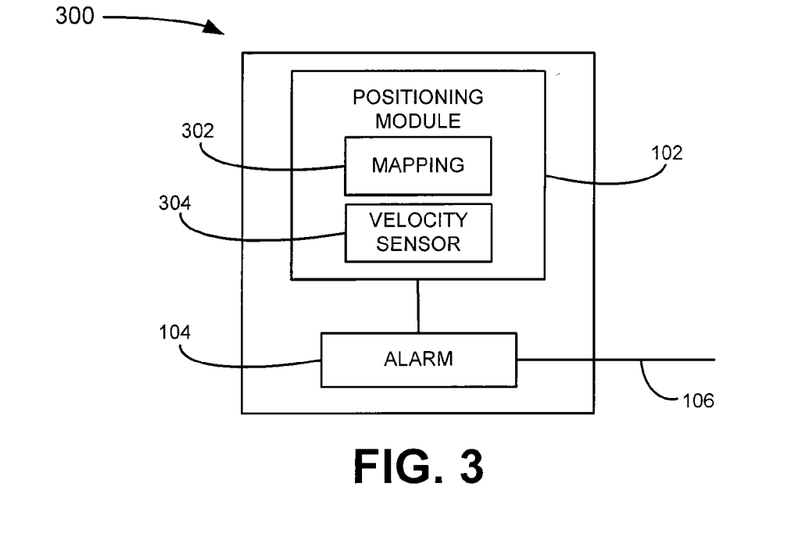
FIG. 3 is an example of a continual query system with a velocity module.

FIG. 3 is an example of a continual query system 300 with a mapping module 302 and a velocity module (or sensor) 304. Mapping module 302 comprises logic for rendering the present coordinates on a virtual map. This enables mapping module 302 to ascertain the type of area the device is located in (for example a street, building, etc.) or distances to nearby hazardous areas. For example, mapping module 302 may suitably comprise a virtual software map. Velocity module 304 can provide either a vector (direction and magnitude) or scalar (magnitude) quantity to positioning module 102. This allows alarm module 104 to determine if the device may enter a hazardous location within a predefined time period; for example, letting a jogger know that he is about to cross a street within three seconds of actually reaching the street. The predefined time period can be variable or user defined. Mapping module 302 also enables the device to suppress false alarms. For example, if there is an obstruction, e.g. a wall, between the associated device and the hazardous area, it is unlikely the associated device will enter the hazardous area; therefore, even though velocity module 304 determines the associated device is moving towards a hazardous area, alarm module 104 can determine from mapping module 302 that there is an obstruction that will prevent the device from reaching the hazardous area and accordingly does not generate an alarm.

Figure 4:
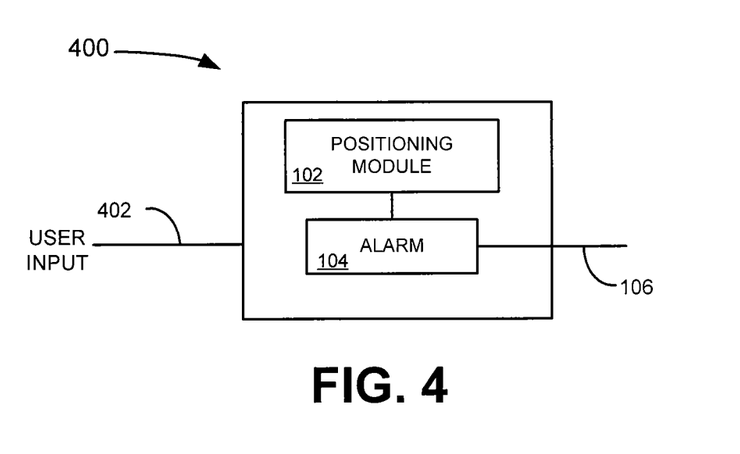
FIG. 4 is an example of a continual query system with a user interface.

FIG. 4 is an example of a continual query system 400 with a user interface 402. User interface 402 can be as simple as a button provided to disable or bypass an alarm, or much more complex, such as for example a keypad, display, and/or voice activated command interface. User interface 402 may further comprise a hardware or software driven menu. For example, user interface 402 can allow a user to specify what type of alarm to emit (audio and/or visual, vibration, etc.). User interface 402 can allow a user to specify an alarm condition; for example, sound a warning if the user is within three seconds of reaching a street, or sound a warning if on a street and a moving vehicle is detected nearby. User interface 402 can also be used to specify certain areas to ignore. For example, certain streets can be suppressed. User interface 402 can also be used to disable alarm module 104. This would allow a user who is a passenger in a car or bus to use the mobile device without receiving constant warnings.

Figure 5:
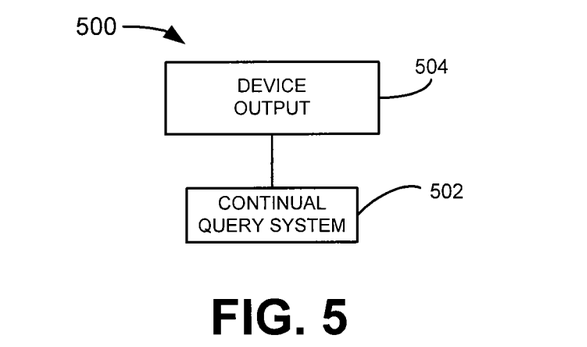
FIG. 5 is an example of a device coupled to a continual query system.

FIG. 5 is an example of a device 500 where the device's output 504 is coupled to a continual query system 502. Continual query system 502 can be configured similarly to any of the example embodiments described herein, for example continual query system 100 (FIG. 1), 200 (FIG. 2), 300 (FIG. 3), and/or 400 (FIG. 4). The output of continual query system 502 is provided directly to device output 504. In this embodiment, the device can be configured to receive the output and respond accordingly. For example, the device may mute (partially or fully) an audio output while superimposing a warning from continual query system 502 onto the device output. As another example, the warning may be in the form of a pre-recorded warning or machine generated speech (such as text to speech "TTS"), or other type of warning such as beeps, pulses of light, etc.

Figure 6:
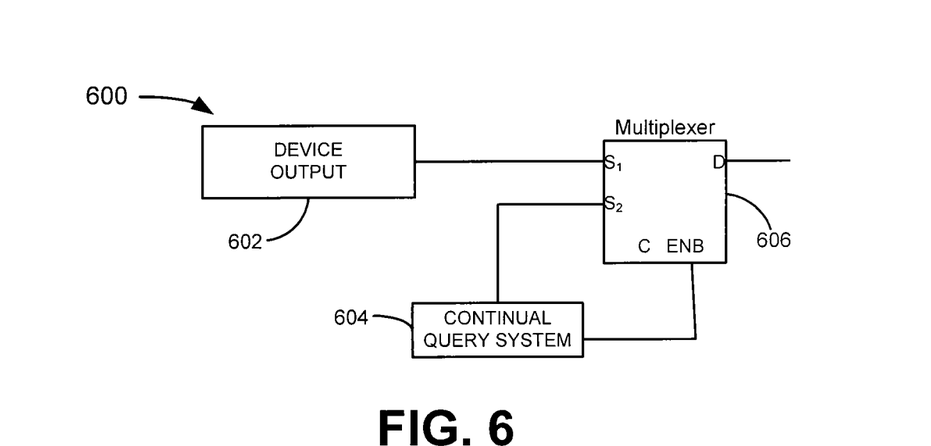
FIG. 6 is an example of a device configured with a continual query system that interrupts the device output.

FIG. 6 is an example of a device 600 configured with an output 602 and a continual query system 604 that interrupts the device output by using a controllable switching device, e.g. a multiplexer 606. For example, multiplexer 606 has two inputs S1 and S2, one output D, and a control logic input C ENB for selecting one of inputs S1, S2 to provide at output D. In this example embodiment, device output 602 is switched through multiplexer 606 while not in a hazardous area. If the continual query system 604 determines the device is in a hazardous area, then continual query system 604 signals the multiplexer 606 to output a signal from the continual query system 604.

Figure 7:
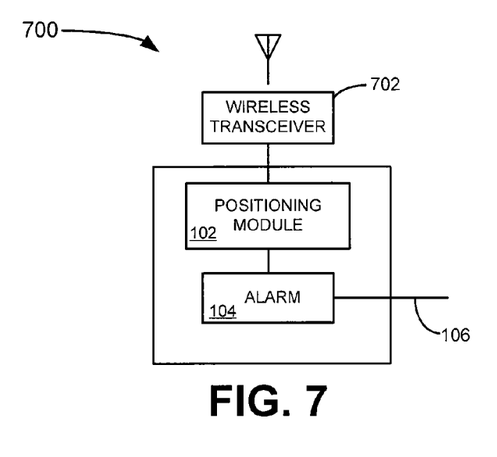
FIG. 7 is an example of a continual query system coupled to a wireless transceiver for acquiring position data.

FIG. 7 is an example of a continual query system 700 coupled to a wireless transceiver 702 for acquiring position data. Wireless transceiver 702 may acquire positioning data from an external source, such as a GPS. In an example embodiment, wireless transceiver 702 receives signals from known sources and positioning module 102 can compute position based on RSSI and/or AOA.

Figure 8:
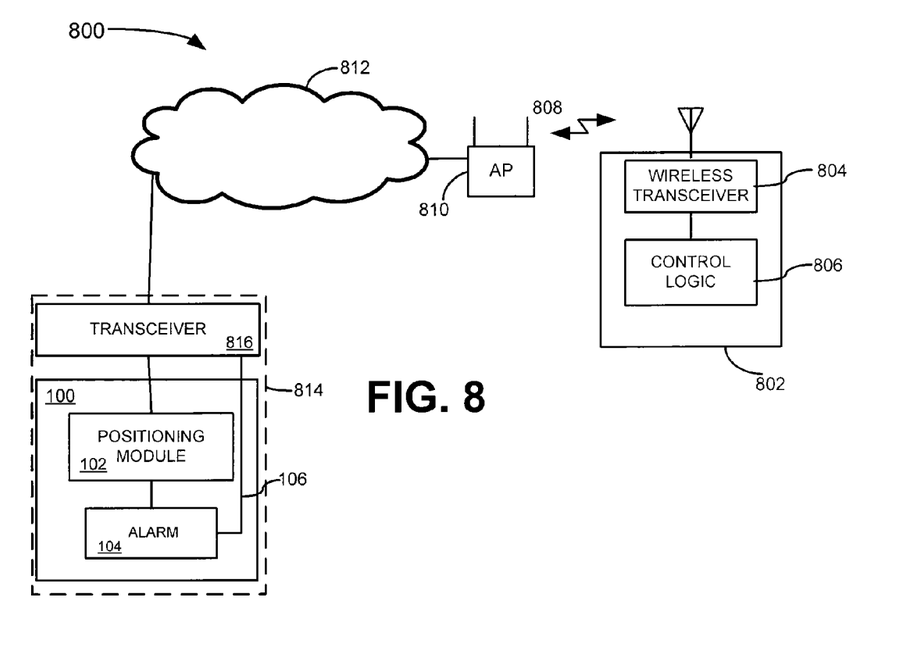
FIG. 8 is an example of a network employing an infrastructure node to provide is warnings to mobile devices associated with the network.

FIG. 8 is an example of a network 800 employing an infrastructure node 814 to provide warnings to mobile device 802 associated with network 800. Mobile device 802 may suitably be any mobile device, such as a portable music player, cellular phone, radio, etc. Mobile device 802 comprises a wireless transceiver 804 that is configured for receiving and, in particular embodiments (such as a cell phone), sending wireless signals. Control logic 806 controls the operation of mobile device 802. Mobile device 802 exchanges wireless signals 808 with an access point (AP) 810 coupled to a network 812. Although the illustrated embodiment shows only one AP 810 coupled to distribution network 812, this should not be construed as limiting the example embodiment to networks with only one AP, as one AP is shown merely for ease of illustration and those skilled in the art should readily appreciate that any physically realizable number of APs may be coupled to distribution network 812.

An infrastructure node 814 is coupled to distribution network 812 and is configured to perform continual query monitoring as described herein. Infrastructure node 814 comprises a transceiver 816 for exchanging data on distribution network 812. In an example embodiment, transceiver 816 is a wired transceiver, such as an Ethernet transceiver. In another example embodiment, transceiver 816 is a wireless transceiver. Infrastructure node 814 comprises a continual query system 100 configured to determine position information for associated mobile devices and provide warnings to the mobile devices as appropriate.

In operation, mobile device 802 associates with network 800 via AP 810. Data from mobile device 802 received by AP 810 (and may also be received by one or more other APs) is communicated to infrastructure node 814 via transceiver 816. For example, AP 810 may provide infrastructure node 814 with RSSI and/or AOA data for signals 808 received from mobile device 802. In an alternative embodiment, mobile device 802 can calculate its location and sends its coordinates to infrastructure node 814. Positioning module 102 maintains data for the current position of mobile device 802. Alarm module 104 determines whether mobile device 802 is in a hazardous area (such as a street). Alarm module 104 communicates a warning to mobile device 802 via output 106 that is forwarded to transceiver 816 when alarm module 104 determines that mobile device 802 is in a hazardous area. The signal is propagated by transceiver 816 onto distribution network 812 to AP 810, where the alarm is communicated to mobile device 802. The alarm is received by wireless transceiver 804 and forwarded to control logic 806. Control logic 806, responsive to receiving an alarm, takes appropriate action to warn a user of the mobile device 802 of the alarm. For example, control logic 806 may sound an audio warning, a video warning (such as a flashing light or superimpose a warning on a video output), and/or cause mobile device 802 to vibrate.

Mobile device 802 may be equipped with a user interface (not shown) to enable a user of the device to suppress the alarm. In particular embodiments, the user interface can be used by a user to communicate areas for control logic 806 to ignore alarms or to allow a user to specify how the alarm should be communicated. In an example embodiment, infrastructure node 814 monitors the location and speed of the ongoing traffic and alerts the user of mobile device 802 of hazardous road conditions.

Figure 9:
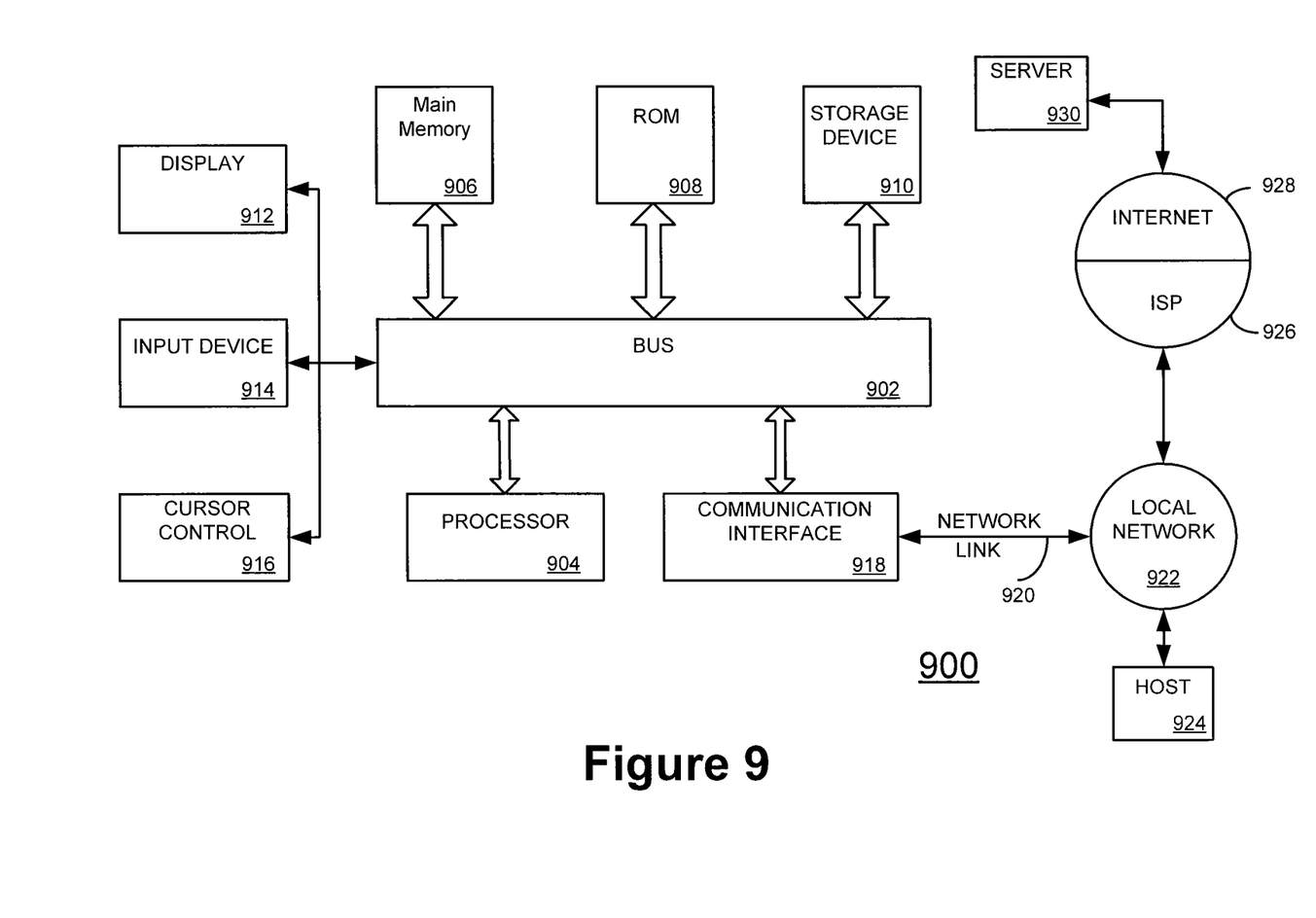
FIG. 9 is an example of a computer system for implementing an example embodiment.

FIG. 9 is a block diagram that illustrates a computer system 900 coupled to a local network 922 providing communication to a host 924, Internet Service Provider (ISP) 926, Internet 928, and Server 930 upon which an example embodiment may be implemented. For example, computer system 900 is suitable to implement continual query system 100 (FIG. 1, et al.), 502 (FIG. 5), 604 (FIG. 6), and/or control logic 806 (FIG.

8). Computer system 900 includes a bus 902 or other communication mechanism for communicating information and a processor 904 coupled with bus 902 for processing information. Computer system 900 also includes a main memory 906, such as random access memory (RAM) or other dynamic storage device, coupled to bus 902 for storing information and instructions to be executed by processor 904. Main memory 906 also may be used for storing a temporary variable or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT) or liquid crystal display (LCD), for displaying information to a computer user. An input device 914, such as a keyboard including alphanumeric and other keys, is coupled to bus 902 for communicating information and command selections to processor 904. Another type of user input device is cursor control 916, such as a mouse, a trackball, or cursor direction keys, for communicating direction information and command selections to processor 904 and for controlling cursor movement on display 912. This input device typically has two degrees of freedom in two axes, a first axis (e.g. x) and a second axis (e.g. y), that allows the device to specify positions in a plane.

An aspect of the example embodiment is related to the use of computer system 900 for mobile device safety. According to an example embodiment, mobile device safety is provided by computer system 900 in response to processor 904 executing one or more sequences of one or more instructions contained in main memory 906. Such instructions may be read into main memory 906 from another computer-readable medium, such as storage device 910. Execution of the sequence of instructions contained in main memory 906 causes processor 904 to perform the process steps described herein. One or more processors in a multi-processing arrangement may also be employed to execute the sequences of instructions contained in main memory 906. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 904 for execution. Such a medium may take many forms, including but not limited to non-volatile media, volatile media, and transmission media. Non-volatile media include, for example, optical or magnetic disks, such as storage device 910. Volatile media include dynamic memory, such as main memory 906. Transmission media include coaxial cables, copper wire, and fiber optics, including the wires that comprise bus 902. Transmission media can also take the form of acoustic or light waves, such as those generated during radio frequency (RF) and infrared (IR) data communications. Common forms of computer-readable media include, for example, floppy disk, a flexible disk, hard disk, magnetic cards, paper tape, any other physical medium with patterns of holes, a RAM, a PROM, an EPROM, a FLASH-PROM, CD, DVD, any other memory chip or cartridge, or any other medium from which a computer can read.

Various forms of computer-readable media may be involved in carrying one or more sequences of one or more instructions to processor 904 for execution. For example, the instructions may initially be borne on a magnetic disk of a remote computer. The remote computer can load the instructions into its dynamic memory and send the instructions over a telephone line using a modem. A modem local to computer system 900 can receive the data on the telephone line and use an infrared transmitter to convert the data to an infrared signal. An infrared detector coupled to bus 902 can receive the data carried in the infrared signal and place the data on bus 902. Bus 902 carries the data to main memory 906 from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling computer system 900 to a network link 920 that is connected to a local network 922.

For example, communication interface 918 may be a local area network (LAN) card, such as Ethernet, to provide a data communication connection to a compatible LAN. As another example, communication interface 918 may be an integrated services digital network (ISDN) card or a modem to provide a data communication connection to a corresponding type of telephone line. Wireless links may also be implemented. In any such implementation, communication interface 918 sends and receives electrical, electromagnetic, or optical signals that carry digital data streams representing various types of information.

Network link 920 typically provides communication, such as voice, video, and/or data communication, through one or more networks to other data devices. For example, network link 920 may provide a connection through local network 922 to a host computer 924 or to data equipment operated by an Internet Service Provider (ISP) 926. ISP 926 in turn provides communications, such as voice, video, and/or data communication, through the worldwide packet data communication network, now commonly referred to as the "Internet" 928. Local networks 922 and Internet 928 both use electrical, electromagnetic, or optical signals that carry the digital data to and from computer system 900, are example forms of carrier waves transporting the information.

Computer system 900 can send messages and receive data, including program codes, through the network(s), network link 920, and communication interface 918. In the Internet example, a server 930 might transmit a requested code for an application program through Internet 928, ISP 926, local network 922, and communication interface 918. In accordance with an example embodiment, one such downloaded application provides for mobile device safety as described herein. The received code may be executed by processor 904 as it is received and/or stored in storage device 910 or other non-volatile storage for later execution.

Figure 10:
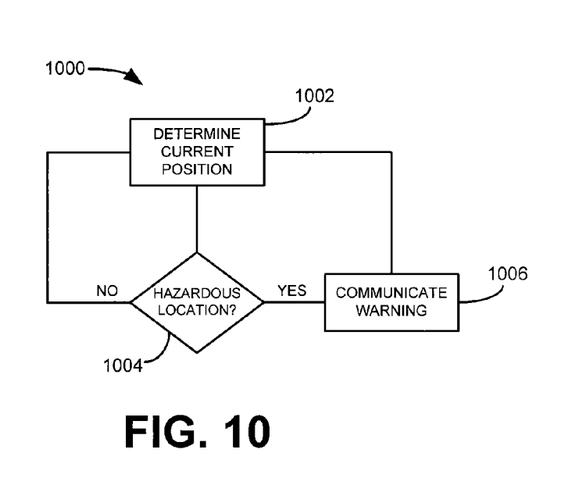
FIG. 10 is a block diagram of an example method for mobile device safety.
Figure 11:
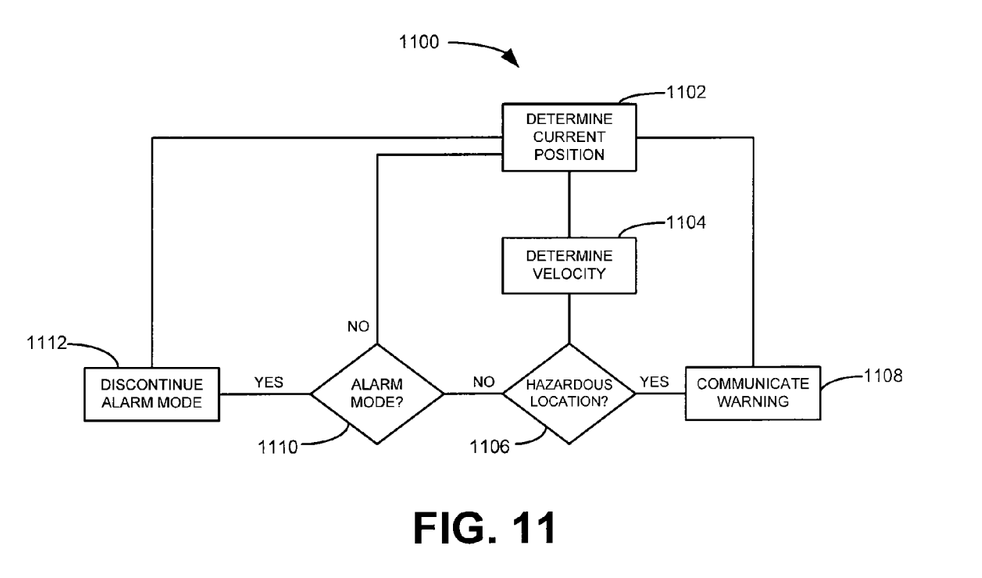
FIG. 11 is a block diagram of an example method for mobile device safety with multiple alarm outputs.

In view of the foregoing structural and functional features described above, methodologies in accordance with example embodiments will be better appreciated with reference to FIGS. 10 and 11. While, for purposes of simplicity of explanation, the methodologies of FIGS. 10 and 11 are shown and described as executing serially, it is to be understood and appreciated that the example embodiments are not limited by the illustrated order, as some aspects could occur in different orders and/or concurrently with other aspects from that shown and described herein. Moreover, not all illustrated features may be required to implement a methodology in accordance with an aspect the example embodiment. The methodologies described herein are suitably adapted to be implemented in hardware, software, or a combination thereof.

FIG. 10 is a block diagram of an example method 1000 for mobile device safety. Method 1000 may suitably be implemented on a continual query system as described herein.

At 1002 the current position of a mobile device is determined. In an example embodiment, the current position is determined by logic contained within the device itself. For example, the device may be coupled to a GPS system or calculate its location based on signal analysis.

In another embodiment, a device on a network determines the current position for a mobile device associated with the network. For example, a server on the network can determine a mobile device's position based on signals received by other infrastructure such as APs. The location of the associated mobile device can be calculated based on RSSI and/or AOA of signals received by the infrastructure nodes. In one example embodiment, the location is a relative position with respect to a hazard. For example, the location can be a relative position with respect to a moving vehicle based on the strength of the signal emitted from a moving vehicle.

In an example embodiment, the current position of the mobile device uses a virtual map in the database of the computer, e.g., mapping module 302 (FIG. 3). This can enable a determination to be made as to whether the mobile device is located in a hazardous area, such in proximity to a street or to an approaching vehicle.

At 1004, a determination is made whether the mobile device is in a hazardous area, or within a certain distance (e.g., a threshold) of a hazardous area. The hazardous location can be any predefined location, such as a street, highway, etc. If at 1004 it is determined that the mobile device is in a hazardous location (YES), at 1006 a warning is communicated. As described herein, the warning may be an audio warning, a visual warning, an audiovisual warning, or other type of warning, e.g., causing the mobile device to vibrate. If at 1004 it is determined that the device is not currently in a hazardous location (NO), at 1002 the method continues to monitor the location of the mobile device. Steps 1002, 1004, and 1006 may be continuously repeated, providing continuous protection for the mobile device.

In an example embodiment, at 1002 the velocity for the associated device is determined. The quantity for velocity may be either vector or scalar. At 1004, determining whether the device is in a hazardous area can include determining from the current position plotted on the virtual map and the velocity whether the associated device will enter a hazardous area within a predetermined time period. As described above, when the system is operational to recognize signals from an approaching vehicle, the mobile device may be static; however, the hazardous area may be encroaching on the end user. Thus, it should be recognized that velocity refers to the relative speed between the mobile device and the hazardous area. This speed may be a result of the motion of the mobile device, the motion of the hazardous area, or a combination of the above. If the mobile device will enter a hazardous area within a predetermined time period (YES), at 1006 a warning is communicated. The warning may be the same type of warning generated when the mobile device is actually in a hazardous area, or may be a different warning. For example, if a device is not yet in the hazardous area, a one-time warning may be 'whispered' to the user, e.g., 'warning, crossing street in three seconds;' whereas, when the device is actually in the hazardous area, the device's output may be paused.

FIG. 11 is a block diagram of an example method 1100 employing a continual query system with multiple alarm outputs. For example, a first output can be employed to communicate a warning (alarm), where a second output can be employed to clear the alarm, e.g., cancel any warning message and inform the device to resume normal operation.

At 1102 the current position of a mobile device is determined. In an example embodiment, the current position is determined by logic contained within the device itself. For example, the device may be coupled to a GPS system or may calculate its location based on signal analysis.

In another embodiment, a device on a network determines the current position for a mobile device associated with the network. For example, a server on the network can determine a mobile device's position based on signals received by other infrastructure such as APs. The location of the associated mobile device can be calculated based on RSSI and/or AOA of signals received by the infrastructure nodes. Although not described in detail herein, an example embodiment contemplates a hybrid topology, wherein the mobile unit and servers attached to the network may collaborate to determine the location of the mobile unit.

In an example embodiment, the current position of the mobile device is rendered on a virtual map. This can enable a determination to be made as to whether the mobile device is located in a hazardous area, such as a street.

At 1104, the velocity for the associated device is determined. The quantity for velocity may be either vector or scalar.

At 1106, a determination is made whether the device is in a hazardous area. This determination can include determining, from the current position plotted on the map and the velocity, whether the associated device will enter a hazardous area within a predetermined time period. If the mobile device is entering (or will enter within a predetermined time period) a hazardous area (YES), at 1108 a warning is communicated. As described herein, the warning may be an audio warning, a visual warning, an audiovisual warning, or other type of warning, e.g., causing the mobile device to vibrate. The warning may be the same type of warning generated when the mobile device is actually in a hazardous area, or may be a different warning. For example, if a device is not yet in the hazardous area, a one-time warning may be 'whispered' to the user, e.g., 'warning, crossing street in three seconds;' whereas, when the device is actually in the hazardous area, the device's output may be paused.

If at 1106 it is determined that the device is not in currently in a hazardous location (NO), at 1110 a determination is made as to whether the device is currently in alarm mode. If the device is currently in alarm mode (YES), at 1112 alarm mode is discontinued. For example, any audio and/or visual warnings will cease. Device operation returns to normal operation. If at 1110 the device is not in alarm mode (NO), monitoring of the current position continues at 1102. Steps 1102, 1104, 1106, 1108, 1110, and 1112 may be repeated continuously, providing continuous protection to the mobile device.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications, and variations that fall within the spirit and scope of the appended claims interpreted in accordance with the breadth to which they are fairly, legally, and equitably entitled.

The invention claimed is:

1. An apparatus, comprising:
  a transmitter;

a receiver;
a positioning module; and
an alarm module;
wherein the positioning module is configured to determine a current location of an associated first device in communication with an associated second device, wherein the associated first device includes a microphone for capturing signals representative of noise surrounding the associated first device;
wherein the alarm module is configured to determine from the current location whether the associated first device is in a predefined hazardous location, the alarm module being operable, responsive to determining the associated first device is in the predefined hazardous location, to communicate a warning to the associated first device and to communicate a signal to initiate an audio output at the associated first device corresponding to the noise signal surrounding the associated first device;
wherein the alarm module is configured to suspend operation of the associated first device while the associated first device is determined to be in the predefined hazardous location until the associated first device no longer in the predefined hazardous location; and
wherein the alarm module is configured to initiate communication of a predefined message to the associated second device via the transmitter, the predefined message being indicative of a presence of the associated first device relative to the predefined hazardous location, the suspended operation corresponding thereto, and that communications will resume after the associated first device is no longer in the predefined hazardous location.

2. The apparatus of claim 1, the positioning module further comprises a mapping module, wherein the mapping module is configured to determine the current location on a virtual map.

3. The apparatus of claim 2, wherein the predefined hazardous location is a street, the alarm module communicates an alarm responsive to determining the associated first device is on a street.

4. The apparatus of claim 1, the alarm module further comprises first and second outputs;
wherein the alarm module transmits a signal on the first output responsive to determining the associated first device is in a predefined hazardous location; and
wherein the alarm module transmits a signal on the second output responsive to determining the associated first device is not in a predefined hazardous location.

5. The apparatus of claim 1, the positioning module further comprises a velocity sensor for determining velocity;
wherein the alarm module determines from the current position and velocity whether the associated first device is at risk for entering a predefined hazardous location in less than a predetermined time; and
wherein the alarm module is responsive to communicate a warning in response to determining the associated first device is at risk for entering a predefined hazardous locations in less than a predetermined time.

6. The apparatus of claim 5, wherein the velocity sensor determines a velocity vector.

7. The apparatus of claim 1, further comprising a user input, wherein activation of the user input discontinues communicating the warning.

8. The apparatus of claim 1, further comprising a user interface, wherein the user interface is operable to receive data representative of areas for the positioning module to ignore and to not communicate warning.

9. The apparatus of claim 8, wherein the user interface is further configured to receive data representative of a type of output for the alarm module to produce while in the alarm state.

10. The apparatus of claim 1, wherein the alarm module is configured to output an audio warning superimposed on the audio output.

11. The apparatus of claim 10, wherein the audio warning is at a higher volume than the audio output of the apparatus.

12. The apparatus of claim 1, further comprising:
a controllable switching device coupled to an audio output of the associated first device and an output of the alarm module;
wherein the controllable switching device is operable to output the audio output of the associated first device while the alarm module is not in an alarm state; and
wherein the controllable switching device is operable to output the output of the alarm module while the alarm module is in an alarm state.

13. The apparatus of claim 1, further comprising a wireless interface in data communication with the alarm module operable to receive a wireless signal from an external source, wherein the alarm module communicates a warning responsive to determining the associated first device is located on a street and receiving a signal via the wireless interface that a vehicle is on the street.

14. The apparatus of claim 1, further comprising a cellular telephone circuit in communication with the alarm module, wherein the alarm module is configured to place a call on hold while the associated first device is in the predefined hazardous location.

15. The apparatus of claim 14, wherein the alarm module is further configured to notify another party to a call associated with the cellular telephone circuit that the call is on hold and the reason for the hold.

16. An apparatus, comprising:
a transceiver operable to send and receive data;
a positioning module;
a non-transitory memory; and
an alarm module;
wherein the positioning module is operable to receive data from the transceiver for determining a current location of an associated wireless first device in communication with a plurality of associated second devices, wherein the associated wireless first device includes a microphone for capturing signals representative of noise surrounding the associated wireless first device;
wherein the alarm module is configured to determine from the current location of the associated wireless first device whether the associated wireless first device is in a hazardous area;
wherein the alarm module is operable to send data to the associated first wireless device via the transceiver responsive to determining the associated wireless first device is in a predefined hazardous area corresponding to the noise signal surrounding the associated wireless first device;
wherein the alarm module is operable to suspend operation of the associated wireless first device while the associated wireless first device is determined to be in the predefined hazardous area until the associated wireless first device is no longer in the predefined hazardous area;
wherein the alarm module is operable to store in the memory data representative of the communication of the plurality of associated second devices while the associated wireless first device is determined to be in the predefined hazardous area for selective playback after the associated wireless first device is no longer in the predefined hazardous area; and wherein the alarm module is operable to initiate a communication of a predefined message to the associated second device via the transceiver, the message being indicative of a presence of the associated first device relative to the predefined hazardous area, the suspended operation corresponding thereto, and that communications will resume after the associated first device is no longer in the predefined hazardous area.

17. The apparatus of claim 16, the positioning module further comprises a mapping module, wherein the mapping module is configured to determine the current location of the associated wireless first device on a virtual map.

18. The apparatus of claim 16, wherein the hazardous area is a street, the alarm module communicates an alarm responsive to determining the associated first device is on a street.

19. A method, comprising:
determining a current position of an associated first device in communication with an associated second device;
rendering the current position based on a virtual map;
determining from the current position rendered on the virtual map whether the associated first device is located in a predefined hazardous area;
communicating a warning to the associated first device responsive to determining the associated first device is located in the predefined hazardous area;
suspending communication of the associated first device with the associated second device while the associated first device is determined to be located in the predefined hazardous area until the associated first device is no longer in the predefined hazardous area;
communicating a signal to the associated first device to initiate an audio output at the associated first device corresponding to a captured signal of noise surrounding the associated first device; and
initiating a communication of a predefined message to the associated second device, the predefined message being indicative of a presence of the associated first device relative to the predefined hazardous location, the suspended operation corresponding thereto, and communication with first device will resume after the associated first device is no longer in the predefined hazardous location.

20. The method of claim 19, further comprising:
determining a velocity for the associated first device;
determining from the current position rendered on the virtual map and the velocity whether the associated first device will enter a hazardous area within a predetermined time period; and
communicating a warning to the associated first device responsive to determining from the current position rendered on the virtual map and the velocity that the associated first device will enter a predefined hazardous area within the predetermined time period.

21. The method of claim 19, further comprising:
determining the relative velocity between the associated first device and the predefined hazardous area;
determining from the current position rendered on the virtual map and the relative velocity whether the associated first device will enter a hazardous area within a predetermined time period; and
communicating a warning to the associated first device responsive to determining from the current position rendered on the virtual map and the velocity that the associated first device will enter a predefined hazardous area within the predetermined time period.

22. The method of claim 19, further comprising:
determining the relative velocity between the associated first device and a moving hazard;
determining from the current position rendered on the virtual map and the relative velocity whether the associated first device will collide with the moving hazard; and
communicating a warning to the associated first device responsive to determining from the current position rendered on the virtual map and the relative velocity that the associated first device will collide with the moving hazard within the predetermined time period.

23. The method of claim 22, wherein the associated first device is not moving.

24. The method of claim 19, further comprising:
obtaining sounds surrounding the first device; and
providing an audio signal representative of the sounds while the first device is determined to be located in the predefined hazardous area until the first device is no longer in the predefined hazardous area.

* * * * *